July 9, 1935.  J. B. POPE  2,007,459

MOLASSES MIXER FOR FEED GRINDING MILLS

Filed July 8, 1933  2 Sheets-Sheet 1

INVENTOR
John B. Pope
by J.H. Weatherford
ATTY.

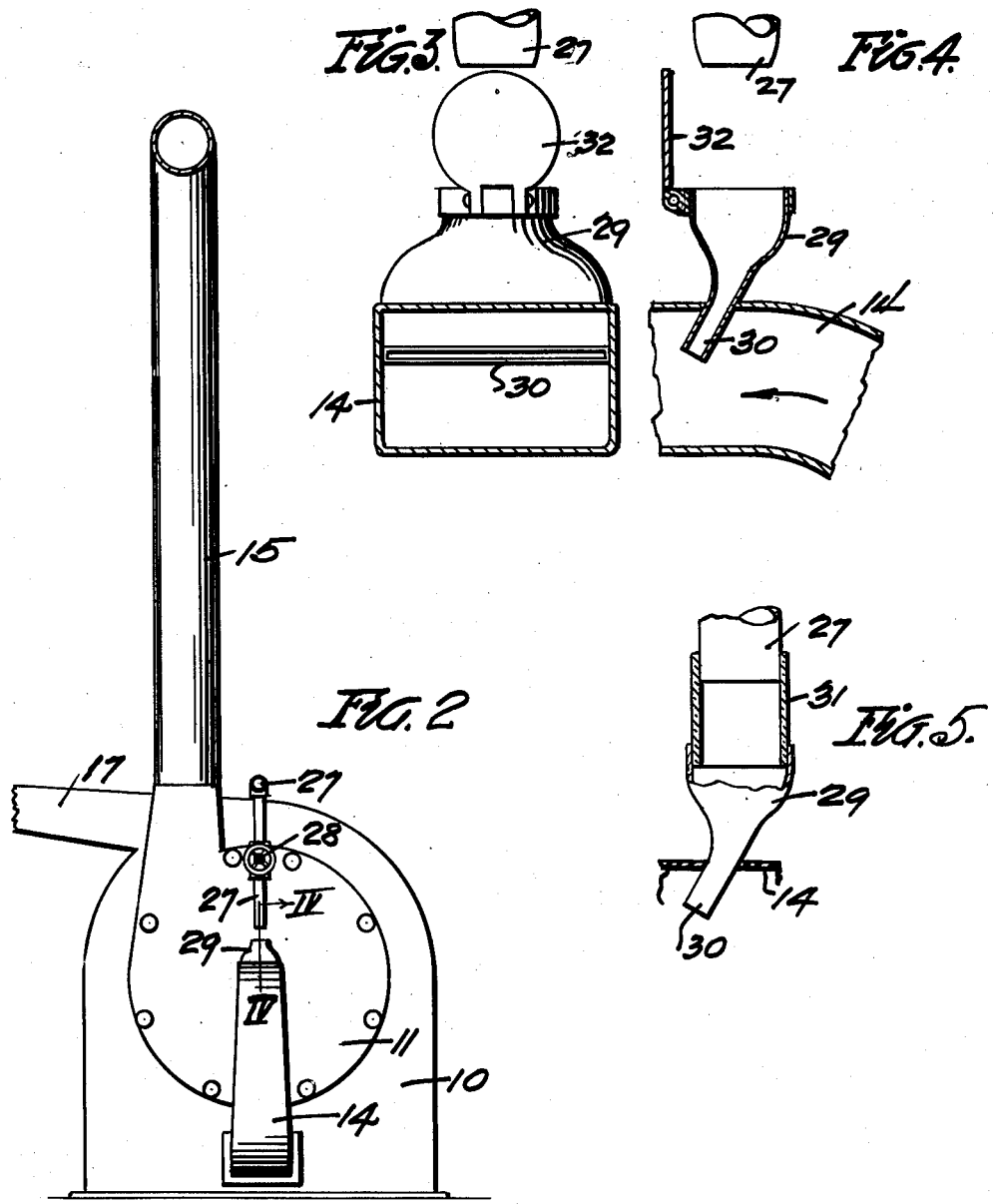

Patented July 9, 1935

2,007,459

UNITED STATES PATENT OFFICE 2,007,459

MOLASSES MIXER FOR FEED GRINDING MILLS

John B. Pope, Pontotoc, Miss.

Application July 8, 1933, Serial No. 679,508

4 Claims. (Cl. 83—11)

This invention relates to attachments for mills for grinding or disintegrating stock feed whereby molasses or the like may be incorporated with the disintegrated feed to make it more palatable as a stock feed.

It has been found that the stalks of various plants, such as corn, peas, soy beans, hay of various kinds and other feeds, contain a very considerable amount of food value but when dry are more or less unpalatable to stock and are therefore largely rejected and wasted by the animals. In an endeavor to correct this it is usual to run the hay, corn, both stalk and ear with its shuck and cobs, or other feed, through a grinding or disintegrating mill, which grinds and shreds the dried plants and incorporates the more palatable portions with the lesser, thereby inducing more complete consumption. In a further endeavor to increase palatability the product often is then put through a mixing machine and a small percentage of molasses or the like is mixed in, making what is known as sweet feed.

The primary object of the present device is to provide means whereby this addition may be accomplished with a minimum of trouble and expense both for equipment and power and may be made available to the small user or individual;

It includes particularly providing means for feeding molasses into and distributing same in the stream of disintegrated feed leaving the grinding mill, and providing subsequent means for completing the incorporation in an efficient manner.

The means by which the foregoing and other objects are accomplished and the manner of their accomplishment will readily be understood from the following specification on reference to the accompanying drawings, in which:

Fig. 2 is a side elevation of the mill and a part of my attachment;

Fig. 3 is an enlarged fragmentary section taken as on the line III—III of Fig. 1;

Fig. 4 is a similarly enlarged fragmentary section taken as on the line IV—IV of Fig. 2;

Fig. 5 is a section taken as on the same line as Fig. 4, showing a modification.

Figure 1:
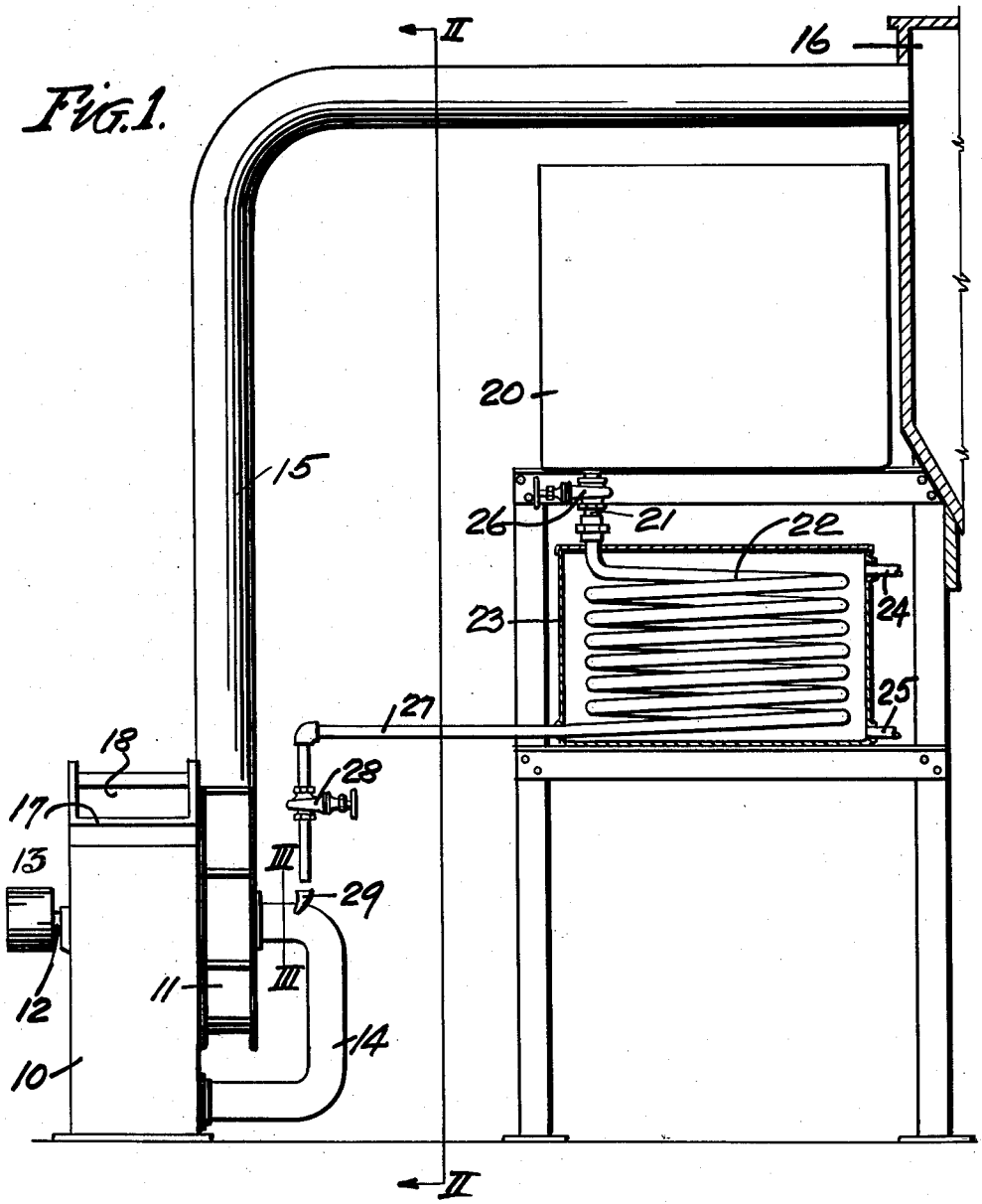
Fig. 1 is an elevation of a typical grinding mill, showing my attachment connected thereto.

Referring now to the drawings in which reference numerals are used to indicate the various parts, 10 is the casing of a typical grinding mill which is equipped with a fan 11 for transferring the disintegrated product. 12 is the shaft of the mill and fan, and 13 a belt pulley through which the shaft is driven. 14 is a flue connecting the mill to the fan, and 15 a discharge flue from the fan to a storage bin 16, or the like. 17 is a charging trough leading to an opening 18 through which the mill is fed.

20 is a tank for storage of molasses, 21 a pipe leading therefrom to a coil 22 in a tank 23 which may be heated as by steam, from a source not shown, led thereinto through pipes 24, 25. Flow to the coil may be controlled by a valve 26.

27 is a pipe from the coil 22 through a feed regulating valve 28 to a distributor 29 which leads into the flue 14.

The distributor 29 has its lower end 30 flattened to approximately the full width of the pipe 14 and extends downward thereinto, such lower end being so disposed relatively to the flue 14 as to present an obtuse angle in the direction of flow through the flue and to shield the open end of the distributor against such flow. Preferably the distributor is spaced from the lower end of the pipe 29 so that flow from that pipe into the distributor may be observed. If desired however, this gap may be bridged by a glass tube 31 as shown in Fig. 5. Where an actual gap is provided provision may be made, such as a hinged cap 32, for closing the distributor when molasses is not being fed.

In using the device, molasses is allowed to run from tank 20 into coil 22, steam is introduced into the tank 23 and the molasses in the coil is heated to insure sufficient liquidity. The mill is started and feed ground therein in usual manner. As the disintegrated product is drawn by the fan 11, through flue 14, valve 28 is opened and molasses delivered to distributor 29 which spreads the flow, fan shaped, and delivers the molasses into the flue where it is mixed into the disintegrated product being assisted by the deflecting action of the distributor. The product thus charged and impregnated is delivered into the fan 11 and is there beaten and thoroughly mixed. Further mixing action is also given in the passage of the mass to the bin. Regulation of the molasses feed is accomplished by the valve 28, is observed in passage of the molasses from the pipe 27 to the distributor 29, and is checked by examination of the finished product in the bin 16.

It will be understood that molasses is the sweetening material usually used in this class of work, but that in the use herein of the term it is intended to cover generically any liquid material used for this purpose.

During use of the molasses feed, air inflow through the distributor is largely if not wholly cut off; otherwise, inflow of air may be cut off as by the cap 32.

It will also be understood that while certain types of disintegrator and/or fan may be more efficient than others and/or better suited for the addition of my improvement, that no claim to the contraction or detail thereof is made and the detail is therefore not illustrated.

Having described my invention, what I claim is:

1. In a device for sweetening stock feed or the like, the combination with disintegrating means, a transfer fan, a flue leading from said means to said fan, a distributor extending into said flue with its discharge end inclined away from flow through said flue, the mouth of said distributor being of substantially the width of said flue, and means for delivering a sweetening liquid to said distributor.

2. In a device for sweetening stock feed or the like, the combination with disintegrating means, a transfer fan, a flue leading from said means to said fan, said flue including a substantially horizontal portion, a distributor depending into said flue with its lower end inclined away from flow through said flue, the mouth of said distributor being of substantially the width of said flue, and means for delivering a sweetened liquid to said distributor.

3. In a device for sweetening stock feed or the like, the combination with disintegrating means, a transfer fan, a flue leading from said means to said fan, said flue including a substantially horizontal portion, a distributor depending into said flue with its lower end inclined away from flow through said flue, the mouth of said distributor being of substantially the width of said flue, means for delivering a sweetened liquid to said distributor, and means for regulating such delivery.

4. In a device for sweetening stock feed or the like, the combination with disintegrating means, a transfer fan, a flue leading from said means to said fan, said flue including a substantially horizontal portion, a distributor depending into said flue with its lower end inclined away from flow through said flue, the mouth of said distributor being of substantially the width of said flue, means for heating a sweetened liquid, means for delivering said liquid to said distributor, and means for regulating such delivery.

JOHN B. POPE.